US 10,704,284 B2

(12) United States Patent
Harada et al.

(10) Patent No.: US 10,704,284 B2
(45) Date of Patent: Jul. 7, 2020

(54) COMBUSTIBLE GAS SUPPLY UNIT AND BARRIER

(71) Applicant: Kobe Steel, Ltd., Hyogo (JP)

(72) Inventors: Shota Harada, Takasago (JP); Akitoshi Fujisawa, Kobe (JP); Kenji Nagura, Takasago (JP); Daisuke Wada, Takasago (JP); Takayuki Fukuda, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/072,853

(22) PCT Filed: Feb. 21, 2017

(86) PCT No.: PCT/JP2017/006344
§ 371 (c)(1),
(2) Date: Jul. 25, 2018

(87) PCT Pub. No.: WO2017/150272
PCT Pub. Date: Sep. 8, 2017

(65) Prior Publication Data
US 2018/0371782 A1   Dec. 27, 2018

(30) Foreign Application Priority Data
Feb. 29, 2016   (JP) .................... 2016-037125

(51) Int. Cl.
E04H 9/14   (2006.01)
F17C 13/12   (2006.01)
E04H 9/02   (2006.01)

(52) U.S. Cl.
CPC ............. E04H 9/14 (2013.01); E04H 9/024 (2013.01); F17C 13/12 (2013.01); F17C 13/123 (2013.01);
(Continued)

(58) Field of Classification Search
CPC . E04H 9/14; E04H 9/024; F17C 13/12; F17C 2260/042; F17C 2221/012; F17C 2223/0123; F17C 2270/0139
See application file for complete search history.

(56) References Cited

U.S. PATENT DOCUMENTS

2003/0056960 A1   3/2003   Del Campo
2013/0233388 A1*  9/2013   Utal .................... F17C 5/007
                                                    137/1

FOREIGN PATENT DOCUMENTS

JP   S53-142741 U   11/1978
JP   S55-124535 A    9/1980
(Continued)

OTHER PUBLICATIONS

Notification of Transmittal of Translation of the International Preliminary Report on Patentability and Translation of Written Opinion of the International Searching Authority; PCT/JP2017/006344; dated Sep. 13, 2018.
(Continued)

Primary Examiner — Patrick J Maestri
(74) Attorney, Agent, or Firm — Studebaker & Brackett PC

(57) ABSTRACT

A combustible gas supply unit is for supplying compressed combustible gas to a dispenser. The combustible gas supply unit includes a high pressure gas facility for handling compressed combustible gas, a base plate having the high pressure gas facility installed thereon and a barrier supported by the base plate to surround at least a part of an outer periphery of the high pressure gas facility. A barrier is shaped to surround at least a part of an outer periphery of the high pressure gas facility and includes a part to be supported by a base plate having the high pressure gas facility installed thereon.

9 Claims, 7 Drawing Sheets

(52) U.S. Cl.
CPC ............... *F17C 2205/0107* (2013.01); *F17C 2205/0111* (2013.01); *F17C 2205/0335* (2013.01); *F17C 2221/012* (2013.01); *F17C 2221/018* (2013.01); *F17C 2221/033* (2013.01); *F17C 2223/0123* (2013.01); *F17C 2223/036* (2013.01); *F17C 2260/042* (2013.01); *F17C 2270/0139* (2013.01); *Y02E 60/321* (2013.01); *Y02P 90/45* (2015.11)

(56) References Cited

FOREIGN PATENT DOCUMENTS

| | | |
|---|---|---|
| JP | S60-041448 U | 3/1985 |
| JP | H06-211303 A | 8/1994 |
| JP | H07-101316 A | 4/1995 |
| JP | 2007327232 A | 12/2007 |
| JP | 2008-057185 A | 3/2008 |
| JP | 4310519 B2 | 8/2009 |
| JP | 2016-199917 A | 12/2016 |

OTHER PUBLICATIONS

The extended European search report issued by the European Patent Office dated Jul. 12, 2019, which corresponds to European Patent Application No. 17759738.2-1010 and is related to U.S. Appl. No. 16/072,853.

\* cited by examiner

COMBUSTIBLE GAS SUPPLY UNIT AND BARRIER

TECHNICAL FIELD

The present invention relates to a combustible gas supply unit and a barrier and more particularly to a combustible gas supply unit for supplying compressed combustible gas to a dispenser and a barrier constituting a part of the combustible gas supply unit.

BACKGROUND ART

In recent years, the development of hydrogen stations for filling hydrogen gas as fuel into a fuel cell vehicle has been underway. Since the hydrogen station includes a combustible gas supply unit with a compressor for compressing hydrogen gas as combustible gas into a high-pressure state and an accumulator for storing high-pressure hydrogen gas, safety measures against an impact by the explosion of the hydrogen gas need to be taken. In response to this, a measure for reducing an impact generated when hydrogen gas explodes by providing a barrier in premises of a hydrogen station and installing a combustible gas supply unit near the barrier is proposed in patent literature 1 below.

Since the combustible gas supply unit needs to be installed near the barrier already provided in the premises in patent literature 1 below, there is a problem of restricting an installation place of the combustible gas supply unit. That is, since the barrier and the combustible gas supply unit are separately provided in patent literature 1 below, the installation place of the combustible gas supply unit needs to be selected in accordance with the position of the barrier.

CITATION LIST

Patent Literature

Patent Literature 1: Publication of Japanese Patent No. 4310519

SUMMARY OF INVENTION

The present invention aims to provide a combustible gas supply unit capable of ensuring safety against the explosion of combustible gas and reducing the restriction of an installation place in premises and a barrier constituting a part of the combustible gas supply unit.

A combustible gas supply unit according to one aspect of the present invention is a combustible gas supply unit for supplying compressed combustible gas to a dispenser. The combustible gas supply unit includes a high pressure gas facility for handling compressed combustible gas, a base plate having the high pressure gas facility installed thereon and a barrier supported by the base plate to surround at least a part of an outer periphery of the high pressure gas facility.

A barrier according to another aspect of the present invention is a barrier constituting a part of a combustible gas supply unit with a high pressure gas facility for handling compressed combustible gas, wherein the barrier is shaped to surround at least a part of an outer periphery of the high pressure gas facility and includes a part to be supported by a base plate having the high pressure gas facility installed thereon.

DESCRIPTION OF EMBODIMENTS

Summary of Embodiment of Present Invention

Figure 1:
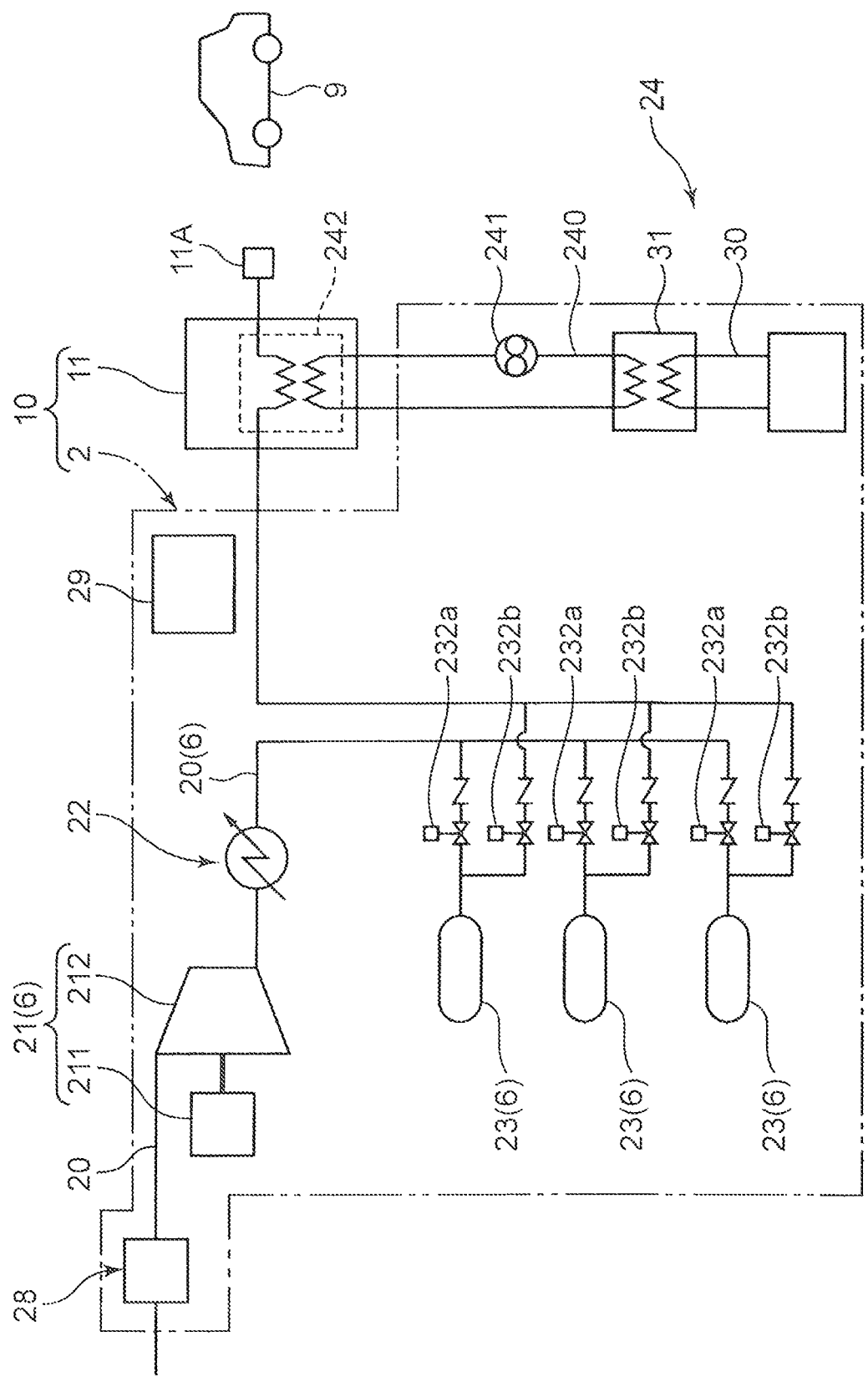
FIG. 1 is a schematic diagram showing the configuration of a hydrogen station according to one embodiment of the present invention.

First, the summary of a combustible gas supply unit and a barrier according to an embodiment of the present invention is described.

The combustible gas supply unit according to this embodiment is a combustible gas supply unit for supplying compressed combustible gas to a dispenser. The combustible gas supply unit includes a high pressure gas facility for handling compressed combustible gas, a base plate having the high pressure gas facility installed thereon and a barrier supported by the base plate to surround at least a part of an outer periphery of the high pressure gas facility. The combustible gas may be, for example, hydrogen gas.

In the above combustible gas supply unit, the outer periphery of the high pressure gas facility for handling the compressed high-pressure combustible gas is surrounded by the barrier. Thus, an impact caused by the explosion of the combustible gas can be reduced by the barrier, and an extent of the impact to the outside of the premises of the high pressure gas facility can be prevented. In this way, safety against the explosion of the combustible gas can be ensured. Further, the combustible gas supply unit is structured such that the barrier is supported by the base plate. Thus, the barrier needs not be provided separately from the combustible gas supply unit in the premises as before. Accordingly, the installation place of the combustible gas supply unit is not restricted by the position of the barrier already provided in the premises, and the installation place of the combustible gas supply unit can be freely selected while safety is ensured. Thus, according to the combustible gas supply unit, it is possible to ensure safety against the explosion of combustible gas and reduce the restriction of an installation place in the premises.

Here, the "barrier" is structured to sufficiently withstand an impact caused by the explosion of the combustible gas and defined in 1.1 to 1.3 of "22. Barriers" in general high-pressure gas safety regulations-related exemplified standards in Japan.

In the above combustible gas supply unit, the barrier may be formed of a steel plate.

According to this configuration, the barrier can be reduced in weight as compared to barriers made of reinforced concrete or a concrete block, and the combustible gas supply unit can be more easily relocated.

In the above combustible gas supply unit, the base plate may be fixed to a ground surface. The barrier may be fixed to the base plate.

According to this configuration, the barrier can be directly supported by the base plate by fixing the barrier to the base plate fixed to the ground surface. In this way, the barrier can be more firmly fixed.

The above combustible gas supply unit may further include a pillar provided upright on the base plate. The barrier may be fixed to the pillar. Further, in the above combustible gas supply unit, a plurality of the pillars may be provided while being spaced from each other. The above combustible gas supply unit may further include a beam stretched between a plurality of the pillars. The barrier may be fixed to the beam.

According to this configuration, the barrier can be even more firmly fixed by being fixed not only to the base plate, but also to the pillars and the beam.

In the above combustible gas supply unit, the base plate, the pillars and the beam may constitute a unit body of a housing structure. The high pressure gas facility may be housed in the unit body. The barrier may cover at least one side surface of the unit body and include a part extending further outward than an upper surface or side surface of the unit body.

According to this configuration, the barrier can function to reduce an impact caused by the explosion of the combustible gas, and noise due to the operation of the high pressure gas facility can be reduced by the barrier. That is, the above barrier can also be utilized as a soundproof wall.

Further, in a method for fixing the barrier, a bolt fastening structure may be adopted to facilitate maintenance and may be arranged such that a shear strength thereof is equal to or higher than a shear strength of the barrier to ensure strength. Further, in the case of providing a door for maintenance, the door has a sliding structure, an inward opening structure, an outer opening structure or a shutter structure, and a shear strength of an opening/closing structure part may be equal to or higher than the shear strength of the bolt fastening structure with the door closed.

The barrier according to this embodiment is a barrier constituting a part of the combustible gas supply unit with the high pressure gas facility for handling compressed combustible gas. The barrier is shaped to surround at least a part of an outer periphery of the high pressure gas facility and includes a part to be supported by a base plate having the high pressure gas facility installed thereon.

According to this configuration, an impact caused by the explosion of the combustible gas can be reduced and the safety of the high pressure gas facility can be ensured by surrounding the outer periphery of the high pressure gas facility by the above barrier. Further, by supporting the above barrier by the base plate, the barrier needs not be provided separately from the combustible gas supply unit in the premises as before. Thus, the installation place of the combustible gas supply unit is not restricted by the position of the barrier already installed in the premises, and the installation place of the combustible gas supply unit can be freely selected while safety is ensured. Therefore, according to the above barrier, it is possible to ensure safety against the explosion of the combustible gas and reduce the restriction of the installation place of the combustible gas supply unit in the premises.

Details of Embodiment of Present Invention

The combustible gas supply unit and the barrier according to the embodiment of the present invention are described in detail below on the basis of the drawings.

<Hydrogen Station>

First, the overall configuration of a hydrogen station 10 with a hydrogen gas supply unit 2 serving as a combustible gas supply unit according to one embodiment of the present invention is described with reference to FIG. 1. The hydrogen station 10 is a facility for filling hydrogen gas as fuel into a vehicle 9, which is a fuel cell vehicle. The hydrogen station 10 includes the hydrogen gas supply unit 2 (combustible gas supply unit) having a high pressure gas facility 6 for handling hydrogen gas (combustible gas) compressed to a high pressure (e.g. 82 MPa) and a dispenser 11 for filling the high-pressure hydrogen gas supplied from the hydrogen gas supply unit 2 into the vehicle 9.

The hydrogen gas supply unit 2 mainly includes a compressor 21, accumulators 23, a high-pressure gas pipe 20, a freezer 24, a receiving unit 28 and a control unit 29. Any of the compressor 21, the accumulators 23 and the high-pressure gas pipe 20 constitutes the high pressure gas facility 6. That is, these are facilities for handing the high-pressure gas exceeding 40 MPa. The high pressure gas facility 6 performs at least any one of the compression of the combustible gas, the storage of the compressed combustible gas and the circulation of the compressed combustible gas. The high-pressure gas pipe 20 is a gas pipe provided downstream of the compressor 21 and constitutes a gas flow passage for supplying the hydrogen gas compressed to a high pressure by the compressor 21 and stored in the accumulators 23 to the dispenser 11. Note that although an arrangement relationship of each constituent element in the hydrogen gas supply unit 2 is schematically shown in FIG. 1, the details of the structure are described later.

The compressor 21 is of a reciprocating type to compress the hydrogen gas fed from the receiving unit 28 and includes a driving unit 211 and a compressing unit 212. The compressing unit 212 includes a piston and a cylinder and can compress the hydrogen gas in the cylinder by driving the piston by power of the driving unit 211. Further, a gas cooling unit 22 for cooling the compressed hydrogen gas by cooling water or the like is provided downstream of the compressor 21. Note that the compressor 21 is not limited to the reciprocating type and may be a screw-type compressor.

A plurality of (three in this embodiment) the accumulators 23 are for storing the high-pressure hydrogen gas fed from the compressor 21. The accumulators 23 have a capsule shape and are respectively designed to have the same design pressure (e.g. 82 MPa). An on-off valve 232$a$ is provided on an inlet side of the accumulator 23, and an on-off valve 232$b$ is provided on an outlet side of the accumulator 23. By controlling these valves by the control unit 29, the inflow of the hydrogen gas from the compressor 21 into the accumulators 23 and the outflow of the gas from the accumulators 23 to the dispenser 11 can be controlled.

The freezer 24 is for cooling brine used to cool the hydrogen gas in the dispenser 11. Specifically, the freezer 24 includes a refrigerant passage 30 in which a refrigerant flows, an evaporating unit 31 provided in the refrigerant flow passage 30, a compressing unit, a condensing unit and an expanding unit. The refrigerant evaporates by heat exchange with the brine in the evaporating unit 31, and is compressed by the compressing unit. The compressed refrigerant flows into the evaporating unit 31 again after being condensed by heat exchange with air in the condensing unit and expanded in the expanding unit.

The dispenser 11 is for filling the high-pressure hydrogen gas fed from the accumulators 23 into the vehicle 9. The dispenser 11 includes a nozzle 11A for filling the hydrogen gas into the vehicle 9 and a built-in pre-cooler 242 constituted by a microchannel heat exchanger. The pre-cooler 242 is provided in a brine flow passage 240. In the pre-cooler 242, the hydrogen gas flowing into the dispenser 11 is cooled by heat exchange with the brine. Then, the brine having absorbed heat from the hydrogen gas by this heat exchange is cooled by the refrigerant in the freezer 24, and the cooled brine is fed to the pre-cooler 242 again by a brine pump 241.

<Hydrogen Gas Supply Unit>

Figure 2:
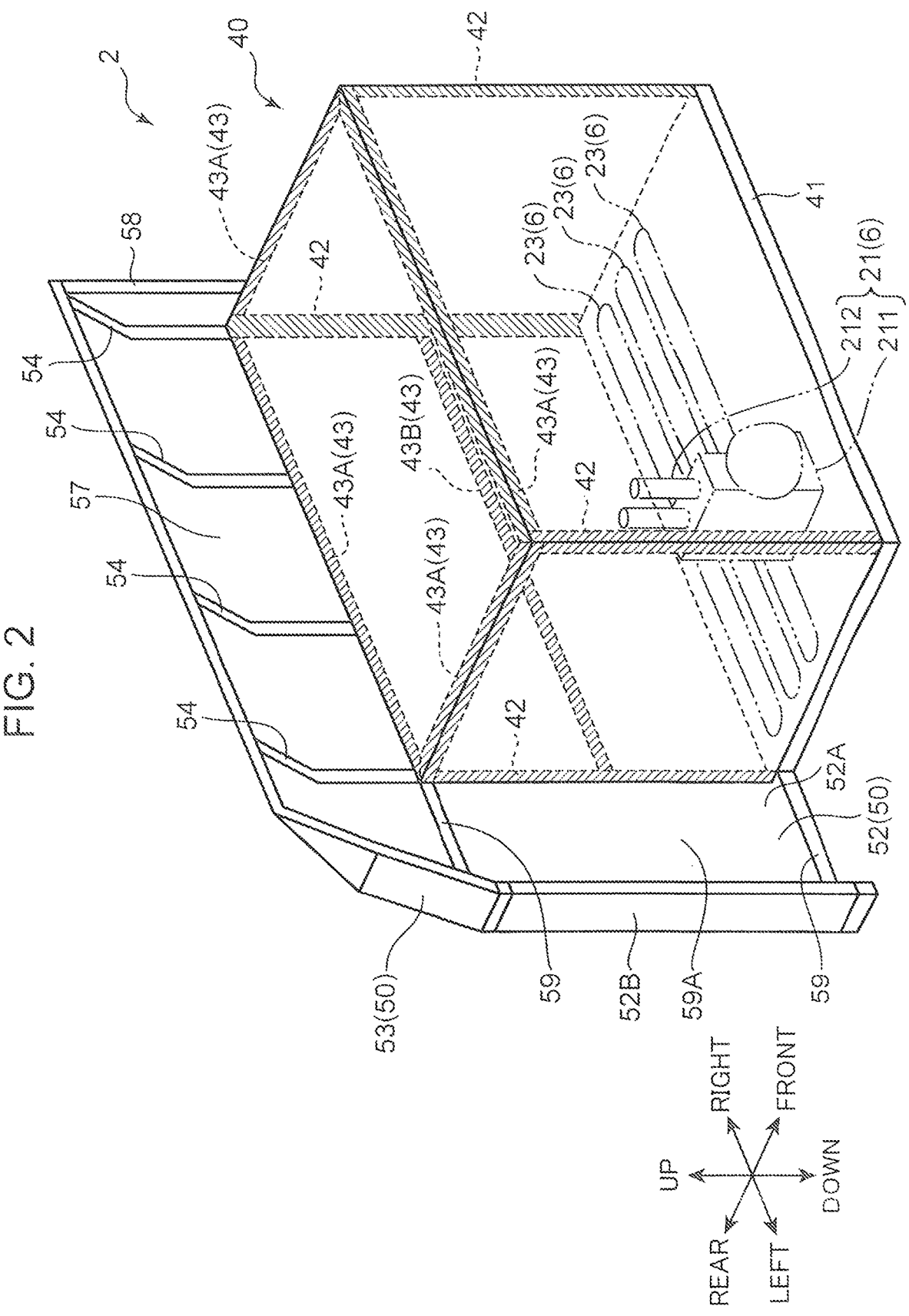
FIG. 2 is a schematic diagram showing the structure of a hydrogen gas supply unit according to the embodiment of the present invention when viewed from front.
Figure 3:
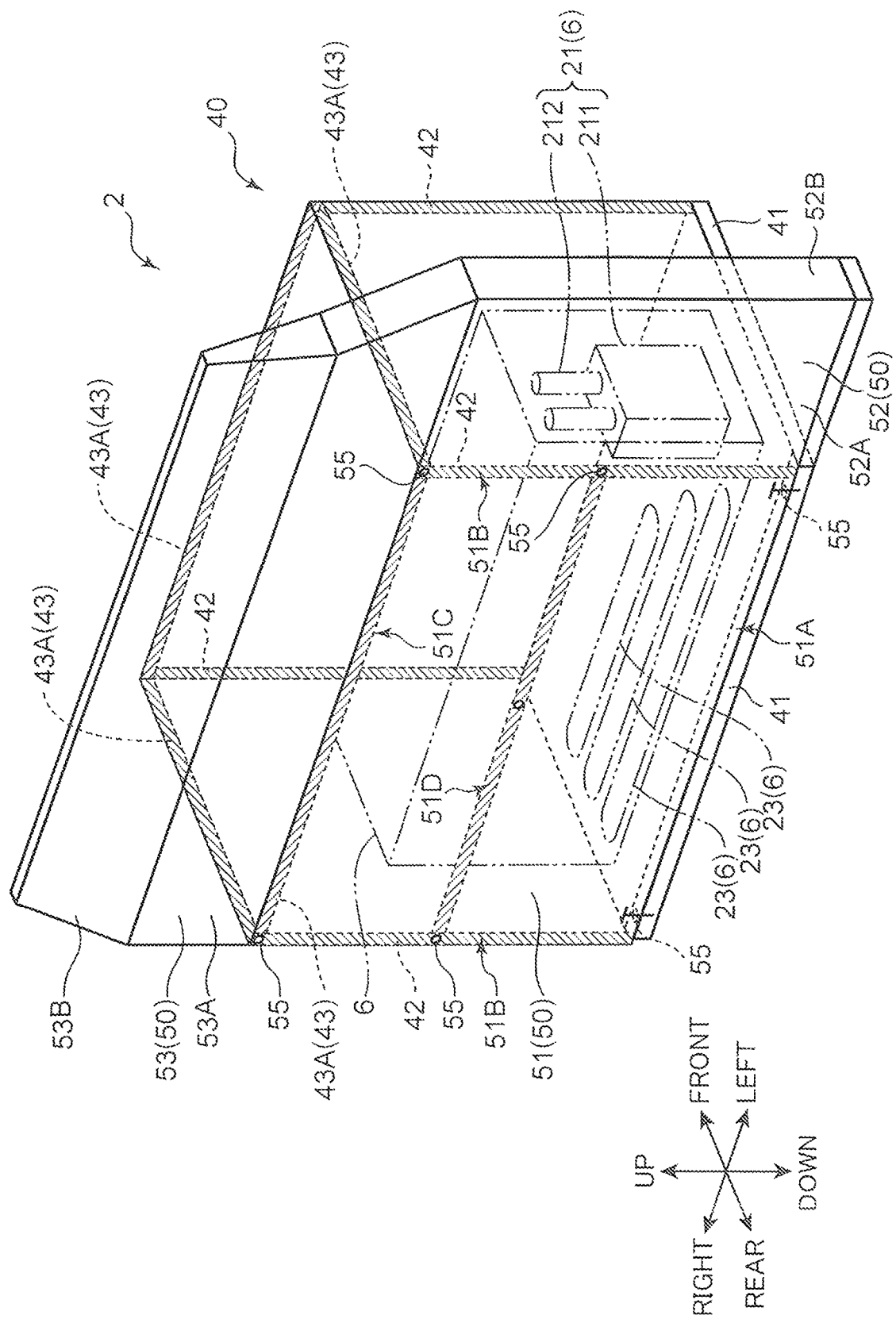
FIG. 3 is a schematic diagram showing the structure of the hydrogen gas supply unit according to the embodiment of the present invention when viewed from behind.

Next, a detailed structure of the above hydrogen gas supply unit 2 is described with reference to FIGS. 2 and 3. FIG. 2 is a perspective view schematically showing the structure of the hydrogen gas supply unit 2 when viewed from front. FIG. 3 is a perspective view schematically showing the structure of the hydrogen gas supply unit 2 when viewed from behind.

The hydrogen gas supply unit 2 is a device for supplying the hydrogen gas compressed to a high pressure (e.g. 82 MPa) in the hydrogen station 10 to the dispenser 11. As shown in FIGS. 2 and 3, the hydrogen gas supply unit 2 includes a unit body 40 formed of a rectangular parallelepiped housing, and the compressor 21, the accumulators 23 and the high-pressure gas pipe 20 constituting the high pressure gas facility 6 are respectively housed in this unit body 40. Note that the high-pressure gas pipe 20 (FIG. 1) is not shown in FIGS. 2 and 3.

The unit body 40 includes a base plate 41, a plurality of (four) pillars 42 provided upright on the base plate 41, beams 43 stretched between adjacent ones of the pillars 42, and has a housing structure by assembling these elements with each other. The base plate 41 constitutes a lower surface of the unit body 40, and is firmly fixed to a ground surface in premises of the hydrogen station 10 by cement or the like. The base plate 41 has a rectangular outer shape and is configured by assembling a plurality of H-shaped steel sections. The compressor 21 and the accumulators 23 are fixed to these H-shaped steel sections.

The pillar 42 are, for example, formed of H-shaped steel sections and provided on four corners of the base plate 41 while being spaced from each other. The pillar 42 has a lower end thereof fixed to the base plate 42 and extends upward perpendicular to a principle surface of the base plate 41.

The beams 43 are formed of H-shaped steel sections similarly to the pillars 42. The beams 43 are stretched between adjacent ones of the pillars 42 to be parallel to the principal surface of the base plate 41. Specifically, the beams 43 include an intermediate beam 43B provided substantially in centers of the pillars 42 in a height direction and four ceiling beams 43A provided atop the pillars 42. As shown in FIGS. 2 and 3, the ceiling beams 43A constitute a frame having substantially the same size and shape as the rectangular base plate 41.

The unit body 40 constitutes a rectangular parallelepiped frame by the base plate 41, the pillars 42 and the beams 43. Soundproof panels (not shown) made of steel plates are mounted on upper, front, right and left side surfaces of this frame. These panels may be provided with doors for maintenance or the like. Further, a cooler (not shown) for cooling devices and the like may be installed on the upper surface of the unit body 40. Note that a frame structure of the unit body 40 is not limited to this and other pillars 42 and beams 43 may be further provided in the structure shown in FIGS. 2 and 3.

As just described, the hydrogen gas supply unit 2 is such that the compressor 21, the accumulators 23 and the high-pressure gas pipe 20 constituting the high pressure gas facility 6 are housed in the unit body 40. Since the high-pressure hydrogen gas handled in such high pressure gas facility 6 is combustible gas which induces a strong impact by explosion, safety measures are required to prevent an extent of this impact to the outside of the premises of the hydrogen station 10. In response to this, the hydrogen gas supply unit 2 is provided with a barrier 50 sufficiently durable against the explosion of the hydrogen gas. The structure of the barrier 50 is described in detail below.

<Barrier>

The barrier 50 constitutes a part of the hydrogen gas supply unit 2 and is constituted by a steel plate structured to sufficiently withstand an impact caused by the explosion of the hydrogen gas. Specifically, the barrier 50 is, for example, a steel plate having a thickness of 6 mm or larger (satisfying a tolerance of ±0.60 mm of a thickness for a steel plate having a thickness of 5.00 mm or larger and below 6.30 mm and a width of 1600 mm or larger and below 2000 mm specified by JIS G3193 (2008) (shapes, dimensions, masses and tolerances of hot rolled steel and steel strips)) or a steel plate having a thickness of 3.2 mm or larger and reinforced by having equilateral angle steel sections of 30×30 mm or larger attached at an interval of 40 cm or shorter in vertical and horizontal directions by welding. Further, the barrier 50 has a height of 2 m or longer and has barrier beams (support pillars) 54, 59 provided at an interval of 1.8 m or shorter. Standards of such a barrier 50 durable against an impact caused by the explosion of the hydrogen gas are determined in general high-pressure gas safety regulations-related exemplified standards in Japan.

As shown in FIG. 3, the barrier 50 is mounted to cover the rear surface of the unit body 40, and has such a plate shape as to surround the outer periphery of a rear side of the high pressure gas facility 6. Specifically, if a virtual rectangular parallelepiped space for housing the compressor 21, the accumulators 23 and the high-pressure gas pipe (not shown) is the high pressure gas facility 6 as shown by chain double-dashed line in FIG. 3, the barrier 50 has a larger lateral width and a larger vertical height than this space, and covers the entire space. Thus, as shown in FIG. 3, the high pressure gas facility 6 is completely shielded by the barrier 50 when the hydrogen gas supply unit 2 is viewed from behind.

The barrier 50 includes a rectangular barrier body 51 extending along the rear surface of the unit body 40, a barrier side part 52 horizontally extended from a left end of the barrier body 51 and a barrier upper part 53 extended upward from an upper end of the barrier body 51. The barrier side part 52 extends further leftward than a left side surface of the unit body 40, and the barrier upper part 53 extends further upward than the upper surface of the unit body 40. As just described, the barrier 50 includes the barrier side part 52 and the barrier upper part 53 as parts extending further outward than the upper surface and side surface of the unit body 40. In this way, noise due to the operation of the compressor 21, the cooler for cooling the devices and the like can be reduced.

The barrier side part 52 is joined to the barrier body 51 by welding. The barrier side part 52 includes a horizontal part 52A horizontally extended from the left end of the barrier body 51 and an extended part 52B linked to the horizontal part 52A and extended forward from an end part of the horizontal part 52A. As shown in FIGS. 2 and 3, the extended part 52B is provided to cover a rear part of the left side surface of the unit body 40. Further, the barrier 50 may be one member or may be constituted by a plurality of laminatable or dividable members.

The barrier upper part 53 is fixed to the barrier body 51 and the barrier side part 52 by fastening members such as bolts. The barrier upper part 53 includes a perpendicular part 53A perpendicularly extended from the upper end of the barrier body 51 and an inclined part 53B linked to the perpendicular part 53A and inclined forward at a constant angle. The inclined part 53B is provided to cover a rear part of the upper surface of the unit body 40. Note that the extended part 52B and the inclined part 53B may be respectively omitted.

As shown in FIG. 2, the barrier side part 52 includes a barrier panel 59A made of a steel plate and two barrier beams 59 fixed at a fixed interval on the barrier panel 59A by welding or the like. Further, the barrier upper part 53 also includes a barrier panel 57 made of a steel plate and a plurality of (four) barrier beams 54 joined at a fixed interval on the barrier panel 57 by welding. Further, a pillar-like support member 58 is joined to the barrier upper part 53 by welding, and a lower end of this support member 58 is located on the upper surface of the unit body 40.

Further, the barrier body 51 also functions as a panel to be mounted on the rear surface of the unit body 40, and the panel may be provided with a door for maintenance or the like. A panel constituting the barrier body 51 may be a single panel or may be composed of a plurality of laminatable or dividable panels.

The barrier 50 includes parts to be supported by the base plate 41. Specifically, the barrier body 51 includes a lower end part 51A to be fixed to the base plate 41, two side end parts 51B to be fixed to two pillars 42 on a rear side, an upper end part 51C to be fixed to the ceiling beam 43A and a central part 51D to be fixed to the intermediate beam 43B. The barrier body 51 is fixed to each of the base plate 41, the pillars 42, the ceiling beam 43 and the intermediate beam 43B, for example, by fastening members such as bolts. That is, the barrier body 51 is formed with bolt holes 55, through which bolts are to be inserted, as parts to be supported by the base plate 41 in the lower end part 51A, the side end parts 51B, the upper end 51C and the central part 51D. Note that the method for fixing the barrier body 51 is not particularly limited, and the barrier body 51 may be fixed by being joined to the base plate 41, the pillars 42 and the beams 43, for example, by welding.

As just described, the above hydrogen gas supply unit 2 is structured such that the barrier 50 is directly supported by the base plate 41 by being fixed to the base plate 41. In other words, the above hydrogen gas supply unit 2 is structured to integrate the unit body 40 and the barrier 50. Thus, a barrier needs not be built separately from the hydrogen gas supply unit 2 in the premises of the hydrogen station 10. Therefore, the above hydrogen gas supply unit 2 needs not be installed near the already provided barrier and the installation place of the hydrogen gas supply unit 2 can be freely selected while safety is ensured. Further, the barrier 50 can be firmly fixed to the ground surface by being directly fixed to the base plate 41.

Figure 4:
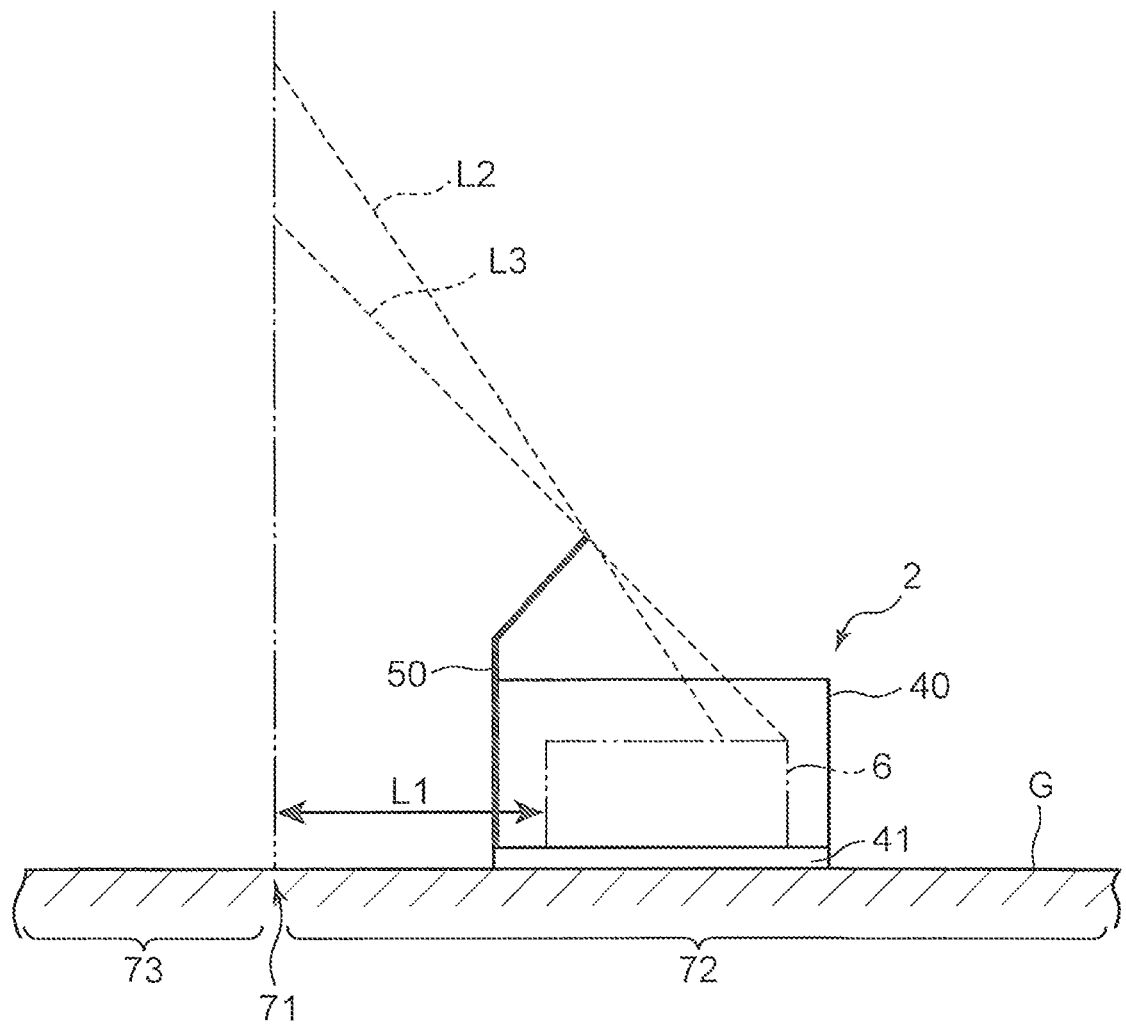
FIG. 4 is a schematic diagram showing a state where the hydrogen gas supply unit is installed near premises boundary of the hydrogen station.

FIG. 4 schematically shows a state where the hydrogen gas supply unit 2 is installed in premises 72 of the hydrogen station. A chain double-dashed line in FIG. 4 indicates a vertical plane of a premises boundary 71, which is a boundary between the premises 72 and an outer region 73 of the premises, and the hydrogen gas supply unit 2 is installed with the barrier 50 facing toward the premises boundary 71 as shown in FIG. 4.

As described above, since the high pressure gas facility 6 is for handling the high-pressure hydrogen gas exceeding 40 MPa (e.g. 82 MPa), it is determined in regulations for the high pressure gas facility 6 to take measures to ensure safety in installation. Specifically, the high pressure gas facility 6 needs to be installed at a distance of 8 m or longer from the premises boundary 71. If it is not possible, a range in which a distance from an outer surface of the high pressure gas facility 6 to the premises boundary 71 is shorter than 8 m needs to be shielded by a barrier satisfying standards determined in the same regulations (general high-pressure gas safety regulations-related exemplified standards in Japan).

In contrast, the barrier 50 satisfying the standards is mounted on the rear surface of the unit body 40 in the above hydrogen gas supply unit 2. This enables the barrier 50 to shield a range where the distance between the outer surface of the high pressure gas facility 6 and the premises boundary 71 is shorter than 8 m even if the hydrogen gas supply unit 2 is installed at such a position that a distance L1 between the rear outer surface of the high pressure gas facility 6 and the premises boundary 71 is 3 m as shown in FIG. 4. In other words, in a range not shielded by the barrier 50, distances L2, L3 between the outer surface of the high pressure gas facility 6 and the premises boundary 71 are 8 m or longer as shown by dotted lines in FIG. 4. In this way, even if the hydrogen gas supply unit 2 is installed near the premises boundary 71, the above standards can be satisfied and the safety of the hydrogen station can be ensured.

(Functions and Effects)

Next, characteristics, functions and effects of the above hydrogen gas supply unit 2 and the barrier 50 are described.

The above hydrogen gas supply unit 2 (combustible gas supply unit) is for supplying compressed hydrogen gas (combustible gas) to the dispenser 11. The above hydrogen gas supply unit 2 includes the high pressure gas facility 6 (compressor 21, accumulators 23 and high-pressure gas pipe 20) for handling compressed hydrogen gas, the base plate 41 having the high pressure gas facility 6 installed thereon and the barrier 50 supported by the base plate 41 to surround the outer periphery of the rear side of the high pressure gas facility 6 and durable against an impact caused by the explosion of the hydrogen gas.

In the above hydrogen gas supply unit 2, the outer periphery of the high pressure gas facility 6 for handling the compressed high-pressure hydrogen gas is surrounded by the barrier 50. Thus, an impact caused by the explosion of the hydrogen gas can be reduced by the barrier 50 and an extent of the impact to the outside of the premises of the hydrogen station 10 can be prevented. In this way, the safety of the hydrogen station 10 can be ensured. Further, the above hydrogen gas supply unit 2 is structured such that the barrier 50 is supported by the base plate 41. Thus, the installation place of the hydrogen gas supply unit 2 is not restricted by a barrier already provided in the premises 72 as before, and the installation place of the hydrogen gas supply unit 2 can be freely selected while safety is ensured. Therefore, according to the above hydrogen gas supply unit 2, it is possible to ensure the safety of the hydrogen station 10 and reduce the restriction of the installation place in the premises 72.

In the above hydrogen gas supply unit 2, the barrier 50 is formed of a steel plate. This can reduce the weight of the barrier 50 as compared to the case of using a barrier made of reinforced concrete or a concrete block, and the hydrogen gas supply unit 2 is more easily relocated.

In the above hydrogen gas supply unit 2, the base plate 41 may be fixed to a ground surface G of the premises 72 of the hydrogen station 10. The barrier 50 may be fixed to the base plate 41. This enables the barrier 50 to be directly supported by the base plate 41 by fixing the barrier 50 to the base plate 41 fixed to the ground surface G of the premises 72. In this way, the barrier 50 can be more firmly fixed.

The above hydrogen gas supply unit 2 includes the plurality of pillars 42 provided upright on the base plate 41 and the beams 43 stretched between the plurality of pillars 42. The barrier 50 is fixed to the pillars 42 and the beams 43. By fixing the barrier 50 not only to the base plate 41, but also to the pillars 42 and the beams 43 in this way, the barrier 50 can be even more firmly fixed.

In the above hydrogen gas supply unit 2, the base plate 41, the pillars 42 and the beams 43 constitute the unit body 40 of the housing structure. The high pressure gas facility 6 is housed in the unit body 40. The barrier 50 covers the rear surface as one side surface of the unit body 40 and includes the barrier side part 52 and the barrier upper part 53, which are respectively parts extending further outward than the side surface and the upper surface of the unit body 40. In this way, the barrier 50 can function to reduce an impact caused by the explosion of the hydrogen gas and noise due to the operation of the high pressure gas facility 6 and the cooler for cooling the devices can be reduced by the barrier 50.

The above barrier 50 is a barrier constituting a part of the hydrogen gas supply unit 2 with the high pressure gas facility 6 for handling compressed hydrogen gas. The barrier 50 is shaped to surround the outer periphery of the high pressure gas facility 6 and includes a part to be supported by the base plate 41 having the high pressure gas facility 6 installed thereon.

By surrounding the outer periphery of the high pressure gas facility 6 by the above barrier 50 in this way, an impact caused by the explosion of the hydrogen gas can be reduced and the safety of the hydrogen station 10 can be ensured. Further, by supporting the above barrier 50 by the base plate 41, the installation place of the hydrogen gas supply unit 2 is not restricted by a barrier already provided in the premises 72 as before, and the installation place of the hydrogen gas supply unit 2 can be freely selected while safety is ensured. Thus, according to the above barrier 50, it is possible to ensure the safety of the hydrogen station 10 and reduce the restriction of the installation place of the hydrogen gas supply unit 2 in the premises 72.

Other Embodiments

Although the barrier 50 is formed of a steel plate in the above embodiment, there is no limitation to this. The barrier 50 may be, for example, formed of reinforced concrete or may be formed of a concrete block. In the case of using reinforced concrete, a reinforced concrete piece is preferably used in which reinforcing bars having a diameter of 9 mm or larger are arranged at an interval of 40 cm or shorter in vertical and horizontal directions, particularly the reinforcing bars on corner parts being reliably bundled, and which has a thickness of 12 cm or larger and a height of 2 m or larger. Further, in the case of using a concrete block, the following block is preferably used. This block is such that reinforcing bars having a diameter of 9 mm or longer are arranged at an interval of 40 cm or shorter in vertical and horizontal directions, particularly the reinforcing bars on corner parts being reliably bundled, and concrete mortar is filled into hollow parts of the block, and this block has a thickness of 15 cm or larger and a height of 2 m or larger. Standards of the barrier formed of reinforced concrete and the barrier formed of a concrete block are also determined in general high-pressure gas safety regulations-related exemplified standards in Japan.

Although the barrier 50 is composed of the barrier body 51, the barrier side part 52 and the barrier upper part 53 in the above embodiment, there is no limitation to this. For example, both the barrier side part 52 and the barrier upper part 53 may be omitted or either one of these may be omitted.

Figure 5:
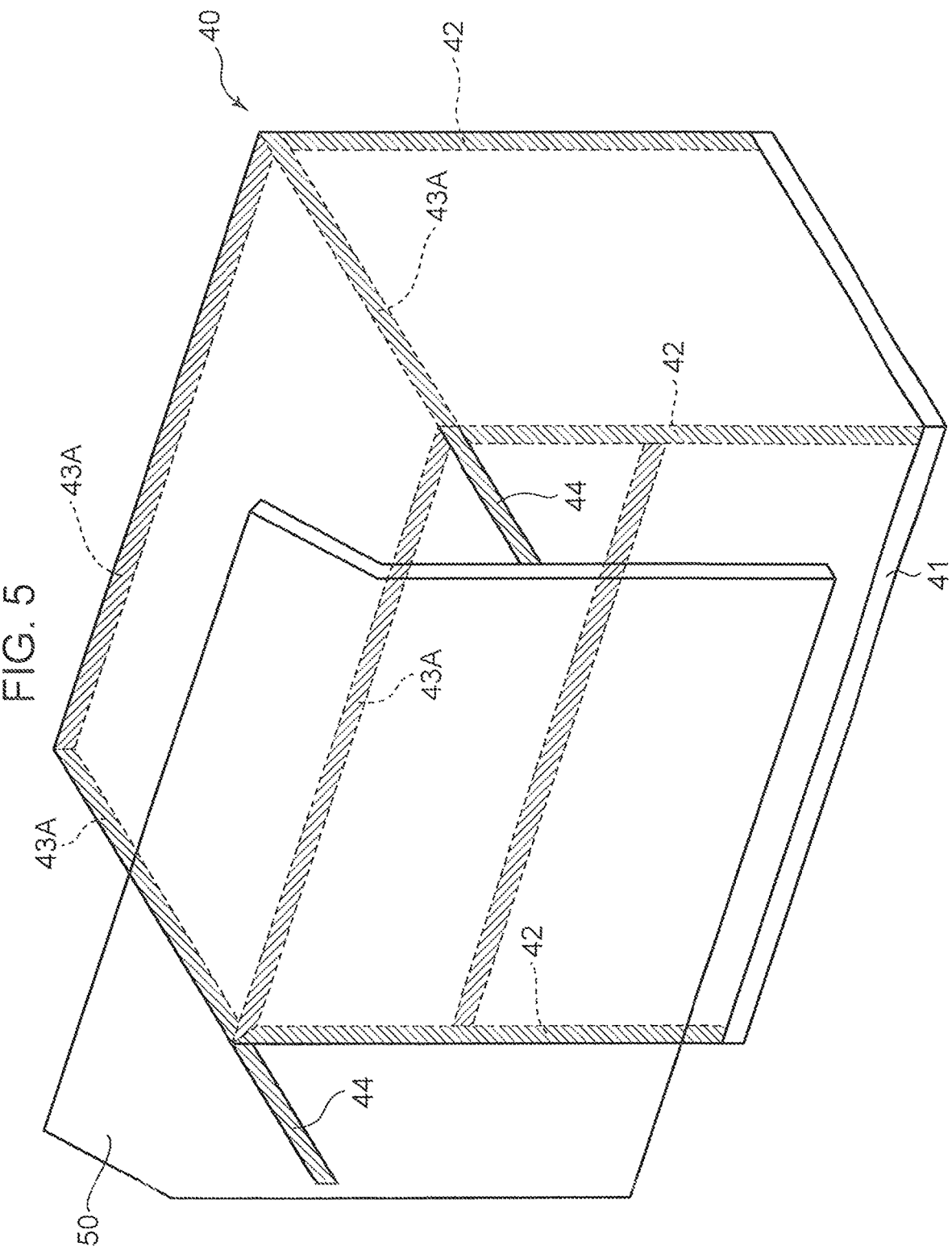
FIG. 5 is a schematic diagram showing the structure of a hydrogen gas supply unit according to another embodiment of the present invention when viewed from behind.

Although the barrier 50 is directly supported by the base plate 41 by being fixed to the base plate 41 in the above embodiment, there is no limitation to this. For example, as shown in FIG. 5, extended parts 44 extended further rearward than the rear surface of the unit body 40 may be provided on the ceiling beams 43A, and the barrier 50 may be fixed to these extended parts 44. In this case, the barrier 50 is not fixed to the base plate 41, and indirectly supported by the base plate 41 via the extended parts 44 of the ceiling beams 43A and the pillars 42. Further, the barrier 50 may be fixed only to the pillars 42 and indirectly supported by the base plate 41 via the pillars 42.

Figure 6:
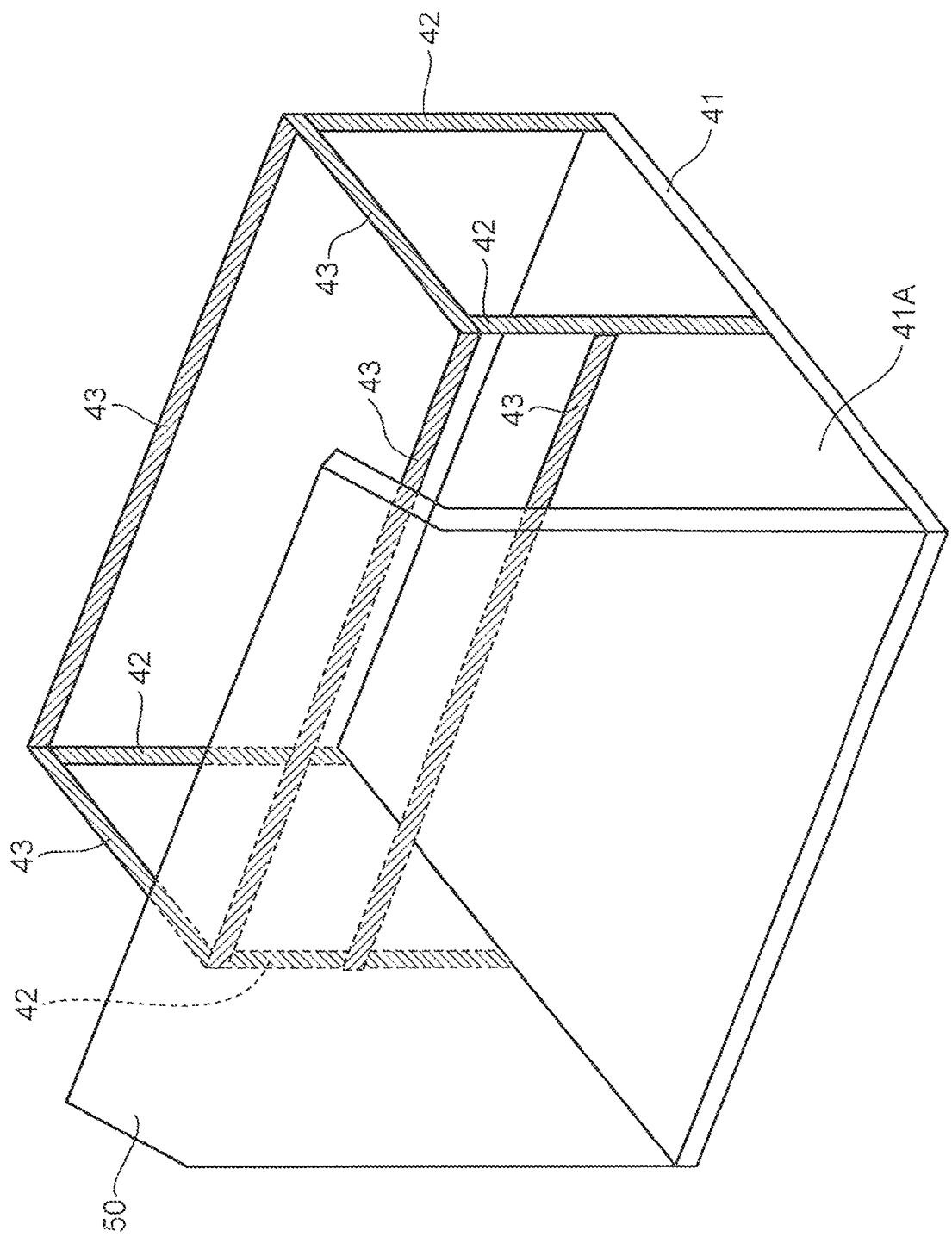
FIG. 6 is a schematic diagram showing the structure of a hydrogen gas supply unit according to another embodiment of the present invention when viewed from behind.

Although the barrier 50 is fixed not only to the base plate 41, but also to the pillars 42 and the beams 43 in the above embodiment, there is no limitation to this. For example, as shown in FIG. 6, the base plate 41 may be extended rearward and the barrier 50 may be fixed to that extended part 41A. In this case, the barrier 50 is fixed neither to the pillars 42 nor to the beams 43, but an effect of reducing an impact caused by the explosion of the hydrogen gas is similarly obtained.

Although the barrier 50 is provided only on the rear surface side of the unit body 40 in the above embodiment, there is no limitation to this. The barrier 50 may surround the outer periphery of a front side of the high pressure gas facility 6 by being provided on a front surface side of the unit body 40 or may surround the outer peripheries of left and right sides of the high pressure gas facility 6 by being provided on the left and right side surfaces of the unit body 40. That is, the barrier 50 is not limited to a mode for surrounding only an outer peripheral part of one side of the high pressure gas facility 6, but the design thereof can be appropriately changed to surround a part needed to be shielded. This is determined in consideration of a relationship between the installation place of the hydrogen gas supply unit 2 and the premises boundary 71, so that the barrier 50 is located between the outer surface of the high pressure gas facility 6 and the premises boundary 71.

Figure 7:
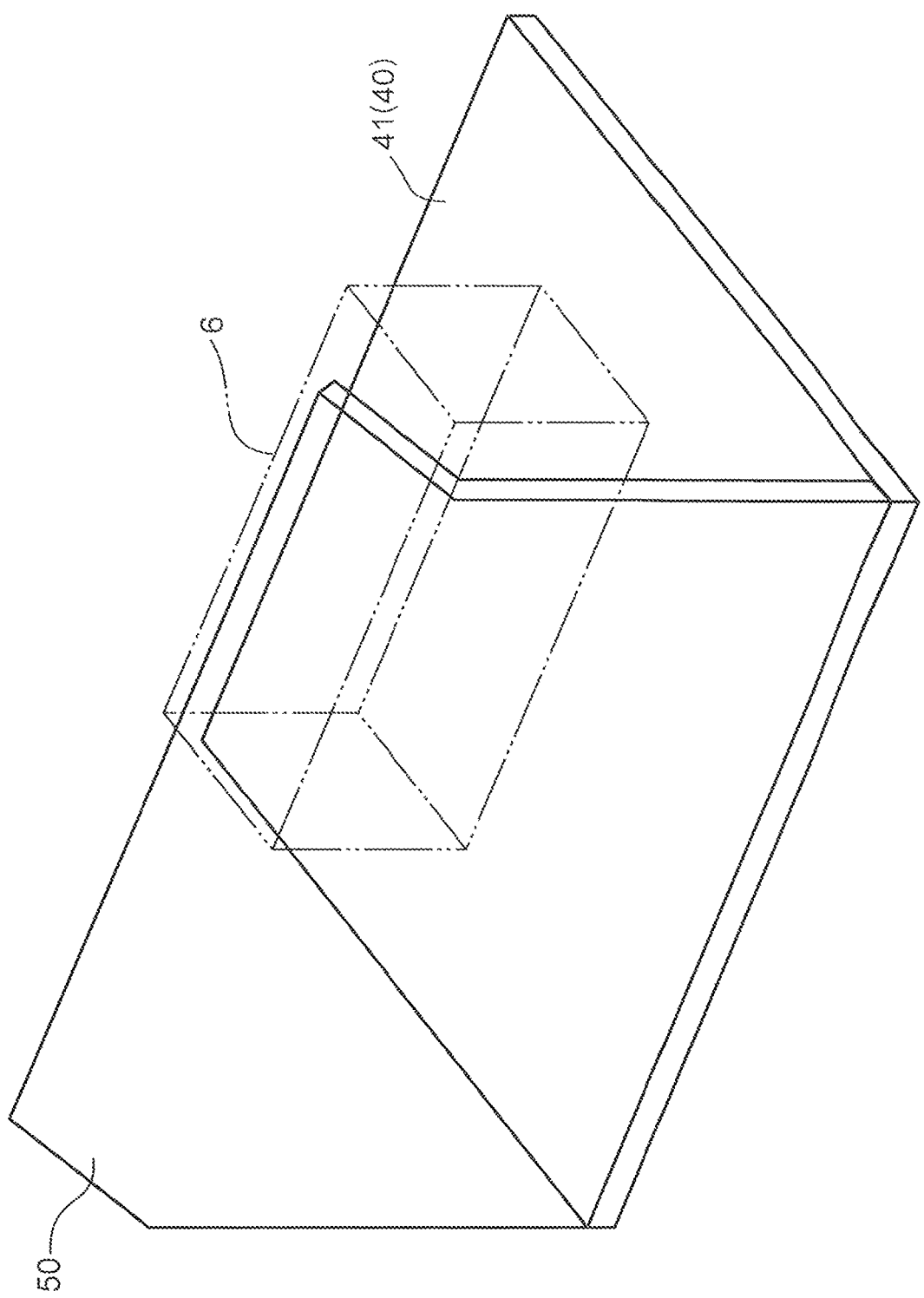
FIG. 7 is a schematic diagram showing the structure of a hydrogen gas supply unit according to another embodiment of the present invention when viewed from behind.

Although the pillars 42 and the beams 43 are provided in the unit body 40 in the above embodiment, there is no limitation to this. As shown in FIG. 7, the unit body 40 may be constituted only by the base plate 41, the high pressure gas facility 6 may be installed on this base plate 41, and the barrier 50 may be fixed to the base plate 41 to surround the outer periphery of the high pressure gas facility 6.

Although only the hydrogen gas supply unit 2 is described as an example of the combustible gas supply unit in the above embodiment, there is no limitation to this. Specifically, the combustible gas supply unit of the present invention can be applied to gas supply units for handling other combustible gases such as hydrocarbon gases including methane, propane and acetylene.

The invention claimed is:
1. A combustible gas supply unit for supplying compressed combustible gas to a dispenser, comprising:
   a high pressure gas facility for handling compressed combustible gas;
   a base plate having the high pressure gas facility installed thereon; and a barrier that is directly or indirectly supported by the base plate to surround at least a part of an outer periphery of the high pressure gas facility; wherein the high pressure gas facility is housed in a unit body of a housing structure, the barrier includes a part extending further upward than an upper surface of the unit body or further laterally than a side surface of the unit body, the barrier is constituted by a plate structured to withstand an impact caused by an explosion of the compressed combustible gas, and the barrier is formed of a steel plate.

2. A combustible gas supply unit according to claim 1, wherein the high pressure gas facility handles hydrogen gas.

3. A combustible gas supply unit according to claim 1, wherein the base plate is fixed to a ground surface and the barrier is fixed to the base plate.

4. A combustible gas supply unit according to claim 2, wherein the base plate is fixed to a ground surface and the barrier is fixed to the base plate.

5. A combustible gas supply unit for supplying compressed combustible gas to a dispenser, comprising:

a high pressure gas facility for handling compressed combustible gas;

a base plate having the high pressure gas facility installed thereon; and a barrier that is directly or indirectly supported by the base plate to surround at least a part of an outer periphery of the high pressure gas facility; wherein the high pressure gas facility is housed in a unit body of a housing structure, the barrier includes a part extending further upward than an upper surface of the unit body or further laterally than a side surface of the unit body, the barrier is constituted by a plate structured to withstand an impact caused by an explosion of the compressed combustible gas, the base plate is fixed to a ground surface, the barrier is fixed to the base plate, the combustible gas supply unit further comprising a pillar provided upright on the base plate, the barrier is fixed to the pillar.

6. A combustible gas supply unit according to claim 4, further comprising a pillar provided upright on the base plate, wherein the barrier is fixed to the pillar.

7. A combustible gas supply unit according to claim 5, wherein a plurality of the pillars are provided while being spaced from each other, the combustible gas supply unit further comprises a beam stretched between the plurality of pillars and the barrier is fixed to the beam.

8. A combustible gas supply unit according to claim 7, wherein the base plate, the pillars and the beam constitute the unit body of the housing structure.

9. A barrier constituting a part of a combustible gas supply unit with a high pressure gas facility for handling compressed combustible gas, wherein the barrier is shaped to surround at least a part of an outer periphery of the high pressure gas facility and includes a part to be directly or indirectly supported by a base plate having the high pressure gas facility installed thereon, the barrier includes a part that is shaped to extend further upward than an upper surface of a unit body that houses the high pressure gas facility or further laterally than a side surface of the unit body, and the barrier is constituted by a steel plate structured to withstand an impact caused by an explosion of the compressed combustible gas.

* * * * *